(12) United States Patent
Sobel

(10) Patent No.: US 8,280,690 B2
(45) Date of Patent: Oct. 2, 2012

(54) SIGNAL PROCESSING METHOD AND UNIT FOR A DIMENSION-GAUGING SYSTEM

(75) Inventor: Jarl Sobel, Vasteras (SE)

(73) Assignee: ABB AB (SE)

( * ) Notice: Subject to any disclaimer, the term of this patent is extended or adjusted under 35 U.S.C. 154(b) by 537 days.

(21) Appl. No.: 12/469,287

(22) Filed: May 20, 2009

(65) Prior Publication Data

US 2009/0230951 A1    Sep. 17, 2009

Related U.S. Application Data

(63) Continuation of application No. PCT/EP2007/062675, filed on Nov. 22, 2007.

(30) Foreign Application Priority Data

Nov. 23, 2006    (EP) .................................... 06124619

(51) Int. Cl.
*G01R 33/00* (2006.01)
*G01R 15/00* (2006.01)
*G01R 29/00* (2006.01)
*G01D 3/02* (2006.01)
(52) U.S. Cl. ........... 702/189; 702/57; 702/109; 324/200
(58) Field of Classification Search .................. 324/200, 324/202, 206, 207.13–207.15, 207.22, 207.23, 324/228, 230, 232, 76.19, 76.33, 76.39, 76.41; 702/189, 33, 38, 57, 64, 65, 66, 75, 86, 97, 702/103, 109, 155, 259, 158, 15, 5, 170, 702/172, 190
See application file for complete search history.

(56) References Cited

U.S. PATENT DOCUMENTS

| 5,541,510 | A | 7/1996 | Danielson |
| 5,847,562 | A | 12/1998 | Fulton et al. |
| 6,502,046 | B1 * | 12/2002 | Yoon et al. ...................... 702/76 |
| 7,113,876 | B2 * | 9/2006 | Zeng et al. ...................... 702/66 |
| 2001/0054894 | A1 * | 12/2001 | Goldfine et al. ......... 324/207.17 |
| 2005/0068026 | A1 * | 3/2005 | May et al. ..................... 324/228 |

FOREIGN PATENT DOCUMENTS

DE    29722715 U1    4/1999

(Continued)

OTHER PUBLICATIONS

International Search Report and Written Opinion, Dec. 12, 2007, 9 pages.

(Continued)

*Primary Examiner* — Michael Nghiem
*Assistant Examiner* — Ricky Ngon
(74) *Attorney, Agent, or Firm* — St. Onge Steward Johnston & Reens LLC

(57) ABSTRACT

A dimension-gauging system to determine at least one dimension of a non-ferrous, electrically conducting object produces a magnetic field inside the object and changes the excitation of the magnetic field. A signal processing unit measures the reaction of the magnetic field to the change in excitation, obtains an actual field transfer function between the excitation and the measured field reaction and determines the at least one dimension of the object by fitting the measured field transfer function to a predetermined field transfer function, where the predetermined field transfer function represents the dynamic behavior between the excitation and the measured field reaction with the one dimension as a parameter.

10 Claims, 2 Drawing Sheets

FOREIGN PATENT DOCUMENTS

| | | |
|---|---|---|
| EP | 0349528 A1 | 1/1990 |
| EP | 1 521 078 A1 | 4/2005 |
| WO | 01/01065 A1 | 1/2001 |
| WO | 2005/064269 A1 | 4/2005 |
| WO | 2005/064268 A1 | 7/2005 |

OTHER PUBLICATIONS

International Preliminary Report on Patentability, Jan. 9, 2009, 10 pages.

* cited by examiner

SIGNAL PROCESSING METHOD AND UNIT FOR A DIMENSION-GAUGING SYSTEM

CROSS-REFERENCE TO RELATED APPLICATIONS

The present application is a continuation of pending International patent application PCT/EP2007/062675 filed on Nov. 22, 2007 which designates the United States and claims priority from European patent application 06124619.5 filed on Nov. 23, 2006, the content of which is incorporated herein by reference.

FIELD OF THE INVENTION

The invention relates to a signal processing method to determine at least one dimension of a non-ferrous, electrically conducting object comprising the step of measuring the reaction of a magnetic field to a change in excitation, where the magnetic field is being applied to the object. The invention relates also to a signal processing unit for a dimension-gauging system.

BACKGROUND OF THE INVENTION

In the field of measurement of dimensions of a non-ferrous, electrically conducting object contactless methods are known which are based on the fact that such an object influences a magnetic field being applied to the object since an electric current is induced inside the object. The influence of the object on the magnetic field depends mainly on the geometrical dimensions and the resistivity of the object. Accordingly, if the resistivity is known, the geometrical dimensions can be identified by measuring the change in the magnetic field caused by the object.

In order to create a distinctive point in time where the objects influence on the magnetic field can be clearly observed, the EP0349528B1 suggests changing the excitation of the magnetic field considerably by switching the current supply off. The time elapsing between the switch-off and the decaying of the part of the magnetic field being present in the air gap between the measuring equipment and the object is measured. The geometrical dimensions of the object are then determined based on the length of the measured time. In the following, the decay of the magnetic field in the air gap is called primary decay.

The method proposed in EP0349528B1 was further improved in WO 01/01065 A1 to achieve a higher accuracy for objects with smaller dimensions. There, the measurement is not started directly after the excitation was changed but only after the primary decay is completed. After the primary decay only the part of the magnetic field inside the object remains which decays with a bigger time delay than the field in the air gap. The decay of the magnetic field in the object can be called secondary decay. The length of the secondary decay depends again on the geometric and resistive parameters of the object. Further embodiments of this method are described in WO 2005/064268 A1 and WO 2005/064269 A1.

The known methods all have in common that a period of time is measured and used to determine the geometrical dimensions of the object. This approach has a main drawback which especially affects the measuring accuracy of objects with small dimensions, like thin sheets. Since only two measurements are used to define the period of time, the initiation of the sampling of these two measurements becomes crucial. Only minor variations in the time to sample caused for example by varying delays in the signal processing circuitry may lead to significant differences in the measurement result. These differences increase with decreased dimensions of the object. Furthermore, the exact determination of the point in time when the change in the excitation of the magnetic field takes effect becomes more important if the object is smaller.

Therefore, it is an object of the current invention to provide a signal processing method and a unit for a dimension-gauging system which is especially applicable to objects with small dimensions, in particular to very thin sheets.

SUMMARY OF THE INVENTION

The object of the invention is achieved by the provision of a signal processing method according to claim 1 and a signal processing unit according to claim 10.

The invention is based on the general idea of searching a solution in the frequency domain instead of the time domain, since a further increase of precision in timing the two measurements discussed above is less applicable due to the resulting considerable effort and expenses.

According to the invention, multiple samples of the time-dependent reaction of the magnetic field to the change in excitation are taken and the multiple samples are used to obtain a measured field transfer function, where the measured field transfer function is a representation of the actual dynamic behaviour between the excitation and the measured field reaction. The at least one dimension of the object is determined by fitting the measured field transfer function to a predetermined field transfer function, where the predetermined field transfer function represents the dynamic behaviour between the excitation and the measured field reaction with the one dimension as a parameter. The inventive signal processing unit comprises the respective means to perform the method steps.

The advantage of the current invention is that the accuracy of the determined dimension is now independent of the specific timing of only a few measurements. Instead, multiple samples are taken, which means that the time-dependent reaction of the magnetic field is taken into account as a whole function. Accordingly, the number of samples should be at least twenty, but considerably higher numbers of samples are preferred. Since more data samples are processed, reliable results are yielded even for very thin sheets.

Preferably, equidistant samples of the time-dependent reaction of the magnetic field are taken, i.e. the sampling is carried out at a constant sampling frequency. This simplifies the subsequent signal processing.

For determining the measured field transfer function it is suggested to use equidistant samples of the time-dependent excitation of the magnetic field and to derive the corresponding frequency transformation by known mathematical methods, or to use a specific signal form in the excitation which may be represented by a low-order transfer function. If the second possibility is applied, preferably a step function is used for the excitation.

In an embodiment of the invention, the predetermined field transfer function is determined as a combination of the transfer function of the excitation with the transfer function representing the transmission behaviour of the non-ferrous object for a magnetic field. The transfer function representing the transmission behaviour of the object can be derived by known methods of control theory, for example by formulating a dynamic model of the behaviour in form of a linear, time-invariant system and by transforming the model into the frequency domain using Laplace transform. By using this approach, the general form of the predetermined field transfer function is better adapted to the real dynamic behaviour of the system compared to a general form found be applying known black-box methods of system identification, where the term system describes the dynamic behaviour between the excitation of the magnetic field and the field reaction caused by the object. In order to determine the transfer function of the transmission behaviour, the field reaction has to be measured on that side of the object which lies opposite to the side of the excitation of the magnetic field.

In a further embodiment, the predetermined field transfer function is determined as a combination of the transfer function of the excitation with the transfer function representing the reflection behaviour of the object for a magnetic field. Accordingly, the field reaction has then to be measured on the same side of the object where the magnetic field is generated.

Both embodiments can also be combined by formulating a predetermined field transfer function which comprises the excitation as well as the transmission and the reflection behaviour of the object. The field reaction is then measured on both sides of the object.

In yet further embodiments, the predetermined field transfer function is even closer adapted to the real system behaviour by taking into account further parts of the system which may influence the system dynamics. It is suggested that a part of the field transfer function may represent the behaviour of a field-generating coil and/or the behaviour of a field-measuring coil and/or the behaviour of a data sampling unit.

The proposed invention is further suggested to be made applicable to the measurement of more than just one dimension of the object. The system model to represent the dynamic behaviour between the excitation and the field reaction, and hence the predetermined field transfer function, can be extended to include the influence of a second and a third dimension of the object or to include material parameters of the object, such as conductivity or resistivity, respectively. In the special field of rolling mills, where thin sheets of non-ferrous, electrically conducting material are produced, it is advantageous to determine the thickness as the at least one dimension and additionally the resistivity of the sheet, in order to have more than just one information on the quality of the product.

BRIEF DESCRIPTION OF THE DRAWINGS

The invention is now described by way of example with reference to the accompanying drawings in which.

DETAILED DESCRIPTION OF THE INVENTION

Figure 1:
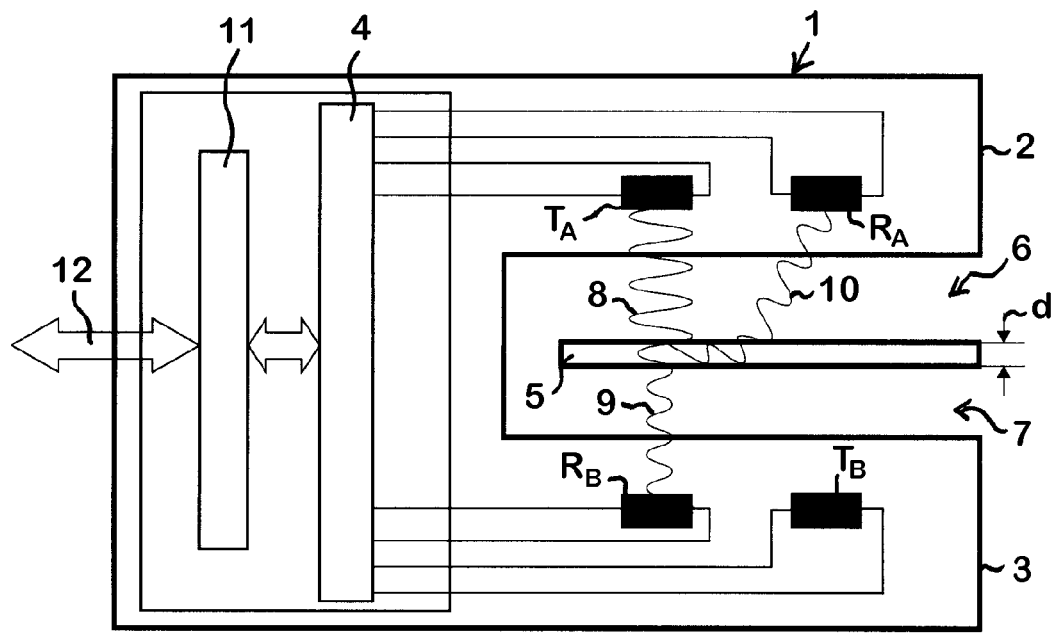
FIG. 1 shows a cross sectional view of a thickness-gauging system and a thin sheet.

The thickness-gauging system 1 of FIG. 1 has a U-shape form. It comprises two coils inside each of the legs of the U-shape; an upper transmitting coil $T_A$ and an upper receiving coil $R_A$ inside the upper leg 2 and a lower transmitting coil $T_B$ and a lower receiving coil $R_B$ inside the lower leg 3. A control unit 4 is connected to the two transmitting coils $T_A$ and $T_B$ in order to control their excitation by applying a corresponding current to them. As a result, a magnetic field develops in the open space between the two legs 2 and 3. This magnetic field penetrates into a thin sheet 5 which is placed inside the open space between the two legs 2 and 3 and which divides the open space into an upper space 6 and a lower space 7. The sheet 5 is made of a non-ferrous, electrically conductive material, such as a non-ferrous metal like aluminium or copper or such as an electrically conductive polymer or rubber, where the material has the resistivity $\rho$. The sheet 5 has the thickness d.

The magnetic field generated by one or both of the transmitting coils $T_A$ and $T_B$ induces a current inside the sheet 5 which in turn induces a voltage in the receiving coils $R_A$ and $R_B$. The induced voltage is measured by the control unit 4. In the special arrangement of FIG. 1, the transmitting coils $T_A$ and $T_B$ and the sheet 5 are placed in such a way to each other that of the three geometric dimensions of the sheet only the thickness d influences the voltages induced in the receiving coils $R_A$ and $R_B$. This arrangement is described in further detail in WO 01/01065A1. Accordingly, the voltages induced in the receiving coils $R_A$ and $R_B$ represent the reaction of the magnetic field, where this reaction depends on the excitation of the field and on the thickness d and the resistivity $\rho$ of sheet 5.

In FIG. 1 it is schematically shown that only the upper transmitting coil $T_A$ is excited. A magnetic field 8 develops inside the upper space 6, which penetrates the sheet 5. While transmitting through the sheet 5 the dynamic behaviour and the amplitude of the magnetic field 8 are changed. Part of the changed magnetic field leaves the sheet 5 on the opposite side of where it penetrated into the sheet. This part of the magnetic field is called transmitted field 9. The transmitted field 9 enters the lower open space 7 and reaches the lower receiving coil $R_B$, where it can be detected. Another part of the changed magnetic field leaves the sheet 5 on the same side of where it penetrated into the sheet. This part is called the reflected field 10 and it extends into the upper open space 6 where it is detected by the upper receiving coil $R_A$.

Connected to the control unit 4 is a signal processing unit 11. The signal processing unit 11 receives from the control unit 4 data representing the time-dependent behaviour of the excitation of the magnetic field and of the reaction of the magnetic field, i.e. the induced voltages. From these data and from predetermined and stored information, the signal processing unit 11 determines the thickness d and the resistivity $\rho$ of the sheet 5 by a method described below. Instead of being arranged as a separate hardware unit as depicted in FIG. 1, the signal processing unit 11 may also be integrated directly in the control unit 4. The signal processing unit 11 is connected to external devices via an interface 12 in order to output the thickness d and the resistivity $\rho$ to a display and/or an external storage unit and/or a central control unit.

In order to determine the thickness d and resistivity $\rho$ from the measured time-dependent behaviours of the excitation and of the field reaction in the frequency domain, the general form of the field transfer function needs to be predetermined, so that the expected number of parameters and their influence on the transfer function are known. In this special example, the general form of the transfer function is determined from a combination of separate transfer functions, each representing the dynamic behaviour of one of the elements influencing the overall dynamics between excitation and measurement of the field reaction. Alternatively, known methods of system identification may be used.

The separate transfer functions are derived by known methods from dynamic models described by differential equations. All the transfer functions described below are assumed to be Laplace transforms, which depend on the complex frequency variable $s=\sigma+j\cdot\omega$, as is known from the state of the art.

Figure 2:
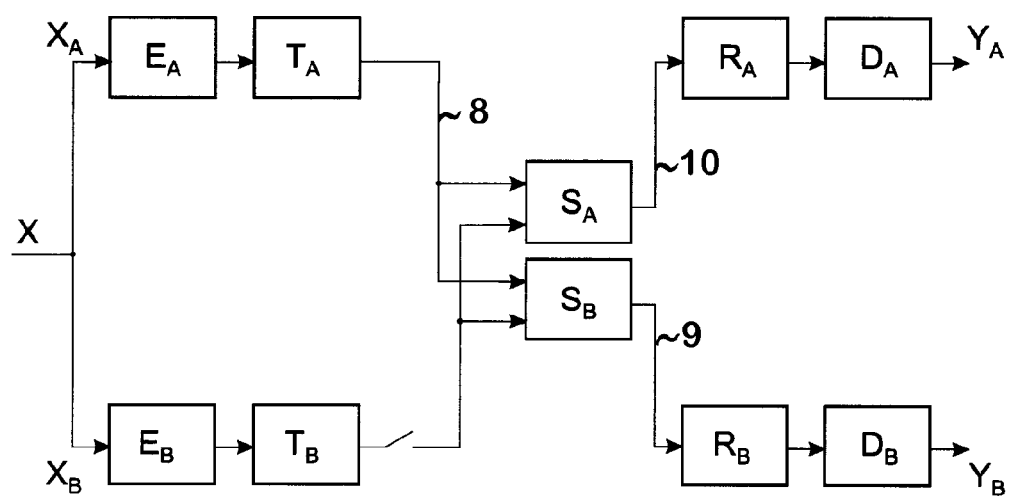
FIG. 2 shows a schematic diagram of the dynamic model of the system between excitation and field reaction.

The overall dynamic system represented by the predetermined field transfer function and the interconnection of its separate parts are shown in the block diagram in FIG. 2. The excitation constitutes the input variable X of the system. Depending on which of the transmitting coils is excited, the input variable may either be specified as $X_A$ or $X_B$. The situation in FIG. 2 corresponds to the situation shown in FIG. 1 where only the upper transmitting coil $X_A$ is excited.

The dynamic behaviour of the control signal generated by the control unit 4 to initiate or change the excitation of the transmitting coil $T_A$ is represented by the transfer function $E_A$. The dynamic behaviour of the upper transmitting coil $T_A$ itself which leads to the actual generation or change of the magnetic field 8, is represented by the transfer function $T_A$. The similar transfer functions, $E_B$ and $T_B$, are derived for the lower side.

As described above, the generated or changed magnetic field 8 is transformed by the sheet 5 into two main parts, the transmitted field 9 and the reflected field 10. The process of transforming one part of the magnetic field 8 into the reflected field 10 is described by the transfer function $S_R = S_A$, and the transformation of another part of the magnetic field 8 into the transmitted filed 9 is described by the transfer function $S_T = S_B$. The process of voltage induction in the receiving coils $R_A$ and $R_B$ is represented by the corresponding transfer functions $R_A$ and $R_B$, and the process of data sampling during the measurement of the time-dependent behaviour of the induced voltages is described by the respective transfer functions $D_A$ and $D_B$.

Accordingly, a transfer function $F_{AR}$ can be derived representing the behaviour between the excitation $X_A$ of the upper transmitting coil $T_A$ and the measurement of the field reaction $Y_{AA}$ at the upper receiving coil $R_A$:

$$F_{AR}(s) = \frac{Y_{AA}}{X_A} = E_A \cdot T_A \cdot S_R \cdot R_A \cdot D_A,$$

with the reflection transfer function $S_R = S_A$.

The transfer function $F_{AT}$ between the excitation $X_A$ of the upper transmitting coil $T_A$ and the measurement of the field reaction $Y_{AB}$ at the lower receiving coil $R_B$ is represented by:

$$F_{AT}(s) = \frac{Y_{AB}}{X_A} = E_A \cdot T_A \cdot S_T \cdot R_B \cdot D_B,$$

with the transmission transfer function $S_T = S_B$.

In the opposite situation where only the lower transmitting coil $T_B$ is excited, the corresponding transfer functions $F_{BR}$ and $F_{BT}$ can be derived as:

$$F_{BR}(s) = \frac{Y_{BB}}{X_B} = E_B \cdot T_B \cdot S_R \cdot R_B \cdot D_B,$$

with the reflection transfer function $S_R = S_B$, and $$F_{BT}(s) = \frac{Y_{BA}}{X_B} = E_B \cdot T_B \cdot S_T \cdot R_A \cdot D_A,$$

with the transmission transfer function $S_T = S_A$.

In order to derive a simplified relation which only contains the influence of the sheet 5 on the magnetic field 8, the transfer functions $F_{AT}$ and $F_{BT}$, respectively, for the transmitted field 9 are divided by the corresponding transfer functions $F_{AR}$ and $F_{BR}$, respectively, for the reflected field 10.

This results in the following equations:

$$\frac{F_{AT}}{F_{AR}} = \frac{Y_{AB}}{Y_{AA}} = \frac{S_T \cdot R_B \cdot D_B}{S_R \cdot R_A \cdot D_A} \text{ and } \frac{F_{BT}}{F_{BR}} = \frac{Y_{BA}}{Y_{BB}} = \frac{S_T \cdot R_A \cdot D_A}{S_R \cdot R_B \cdot D_B}.$$

By multiplying these two expressions, a simplified relation is derived which only contains the transfer functions $S_T$ and $S_R$ representing the transmission and the reflection behaviour of the sheet 5:

$$G(s) = \frac{Y_{AB} \cdot Y_{BA}}{Y_{AA} \cdot Y_{BB}} = \left(\frac{S_T}{S_R}\right)^2.$$

This simplified relation G(s) is the general form of the predetermined field transfer function used in the method described below to determine the thickness d and the resistivity ρ of the sheet 5.

In the following it is assumed that the quotient of the transfer functions $S_T$ for the transmitted field 9 and $S_R$ for the reflected field 10 is of first order and has the following form:

$$\frac{S_T}{S_R}(s) = \frac{b}{a \cdot s + 1}.$$

Accordingly, the parameters of the predetermined field transfer function G(s) are the gain b and the time constant a. Both parameters change with changing thickness d and resistivity ρ of the sheet 5, so that G(s) can also be written as G(d, ρ).

Figure 3:
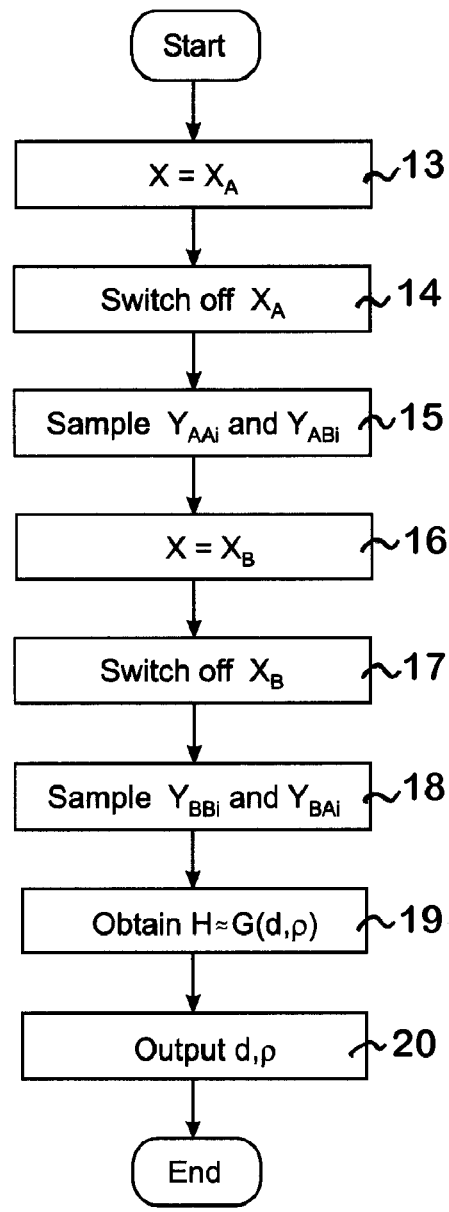
FIG. 3 shows a flowchart of a signal processing method to determine thickness and resistivity.

The method to determine the thickness d and the resistivity ρ of the sheet 5 begins with the excitation of the upper transmitting coil $T_A$ in method step 13, as is depicted in FIG. 3. In the example described here, a constant current is applied to the upper transmitting coil $T_A$. This current must be applied long enough so that the resulting magnetic field 8 can penetrate into the object 5. In step 14 the excitation is changed suddenly and substantially by switching the current through the upper transmitting coil $T_A$ off. The reaction of the magnetic field is measured by sampling the voltages induced in the upper and the lower receiving coils, $R_A$ and $R_B$, at a constant sampling rate of for example 100 Mega samples per second. This means that a measurement is taken every 0.01 microseconds. The samples are stored as $Y_{AAi}$ and $Y_{ABi}$, with i being the sampling index. The measuring time is chosen to be long enough to capture the whole field reaction to the changed excitation. The same procedure for obtaining samples of field reaction $Y_{BBi}$ and $Y_{BAi}$ is repeated in steps 16 to 18 with the lower transmitting coil $T_B$ being excited.

In step 19 a measured field transfer function H is obtained by using known methods of system identification and applying them to the following data: the known time-dependent excitation or input function which is represented by a step function X(s)=1/s, the samples $Y_{AAi}$, $Y_{ABi}$, $Y_{BBi}$ and $Y_{BAi}$ from the field reaction and the expected form of the field transfer function taken from the predetermined field transfer function G(s). In case the excitation can not be represented easily by a known function, the excitation X needs to be sampled, too.

The measured field transfer function H and the predetermined field transfer function G(d, ρ) are numerically fitted as close as possible to each other by iteratively changing the parameters thickness d and resistivity ρ.

Figuratively, this can be understood as bringing the bode plot of the predetermined field transfer function G(d, ρ) to overlap with the bode plot of the measured transfer function H.

If the resistivity ρ is known beforehand, a similar method can be applied to determine only the thickness d using a predetermined function G(d) which only depends on the thickness d.

The resulting thickness d and resistivity are output in step 20 to an external unit, which can be a display and/or a storage unit and/or a central control unit.

What is claimed is:

1. A signal processing method to determine at least one dimension of a nonferrous, electrically conducting object by measuring the reaction of a magnetic field to a change in excitation, where the magnetic field is being applied to the object, comprising the steps of:
   acquiring multiple samples of the time-dependent reaction of the magnetic field,
   obtaining from the multiple samples a measured field Laplace transform transfer function which represents actual dynamic behaviour between the excitation and the measured field reaction, and
   determining, via software executing on a signal processing unit, the at least one dimension of the object by fitting the measured field Laplace transform transfer function to a predetermined field Laplace transform transfer function, where the predetermined field Laplace transform transfer function represents the dynamic behaviour between the excitation and the measured field reaction with the at least one dimension as a parameter; and a part of the predetermined field Laplace transform transfer function represents the transmission behavior of the object for a magnetic field and another part of the predetermined field Laplace transform transfer function represents the reflection behavior of the object for a magnetic field.

2. The method according to claim 1, wherein the measured transfer function is obtained using equidistant samples of the time-dependent reaction of the magnetic field.

3. The method according to claim 1, wherein the measured transfer function is obtained using equidistant samples of the time-dependent excitation of the magnetic field.

4. The method according to claim 1, wherein the measured transfer function is obtained using an excitation which can be represented by a low-order transfer function.

5. The method according to claim 4, wherein the excitation is a step function.

6. The method according to claim 1, wherein a part of the predetermined field transfer function represents behaviour of a field-generating coil.

7. The method according to claim 1, wherein a part of the predetermined field transfer function represents behaviour of a field-measuring coil.

8. The method according to claim 1, wherein a part of the predetermined field transfer function represents behaviour of a data sampling unit.

9. The method according to claim 1, where additionally resistivity of the object is determined by using a predetermined field transfer function which represents dynamic behaviour between the excitation and the measured field reaction with the at least one dimension as a parameter and resistivity as another parameter.

10. A signal processing unit for a dimension-gauging system comprising means to measure the reaction of a magnetic field to a change in excitation, where the magnetic field is being applied to a non-ferrous, electrically conducting object, characterized by
    means to acquire multiple samples of the time-dependent reaction of the magnetic field,
    means to obtain from the multiple samples a measured field Laplace transform transfer function which represents the actual dynamic behaviour between the excitation and the measured field reaction,
    means to determine the at least one dimension of the object by fitting the measured field Laplace transform transfer function to a predetermined field Laplace transform transfer function, where the predetermined field Laplace transform transfer function represents the dynamic behaviour between the excitation and the measured field reaction with the at least one dimension as a parameter;
    wherein a part of the predetermined field Laplace transform transfer function represents the transmission behavior of the object for a magnetic field and another part of the predetermined field Laplace transform transfer function represents the reflection behavior of the object for a magnetic field.

* * * * *